3,337,290
POLYOLEFIN DYEING

Henry W. Pons, Lock Haven, and Hans Dressler, Pitcairn, Pa., assignors to American Aniline Products, Inc., a corporation of Maryland
No Drawing. Filed Apr. 28, 1964, Ser. No. 363,279
7 Claims. (Cl. 8—42)

This invention relates to the coloring of polyolefins. In one specific aspect, it relates to the application of a heretofore unrecognized class of colorants to polyolefins, particularly polypropylene, in the form of yarn, fabric, filaments or film.

The polymers made from lower mono-alpha-olefins, particularly polypropylene, are known to have good fiber forming properties. One of the difficulties confronting the textile industry in making new fabrics from these polymers is the problem of coloration. Polypropylene and polyethylene lack the functional groups along the chain of the polymer that tend to permit dystuffs to be absorbed or otherwise bound firmly by physical or chemical forces.

Considerable research effort has been expended in providing a satisfactory process for dyeing polyolefins. In the recently issued patent to Joseph Bianco et al. U.S. 3,128,146, there is described a method of dyeing polypropylene by immersing the polymer in an emulsified dye liquor at a temperature between 27° C. and the boiling point of the liquor. The dye liquor is prepared by dissolving a water-insoluble, oil-soluble dyestuff in an inert organic solvent. The Bianco process provides colored polyolefins which are surprisingly fast to light, fast to soaping and crocking. Unfortunately, the dry cleaning resistance of the dyed fiber is somewhat limited.

Recently, an effort has been made to provide a polymer of improved dyeability by the incorporation into the polymer of a polyvalent metal, such as nickel, chromium, cobalt, aluminum, titanium or zinc. The preparation of such metal-containing polymers is described in the patent to Caldwell et al., U.S. 2,984,634.

We have discovered that a class of azo dyes not heretofore recognized as colorants for fabrics can be applied to metal-containing polypropylene to give red to violet dyeings having a tinctorial strength 8–16 times greater than that of azo dyes ordinarily recommended for this purpose. The dyeings obtained using our heretofore unrecognized class of colors have excellent wash and dry cleaning fastness and a lightfastness of sixty hours or greater, as determined by accelerated laboratory testing methods.

It is, therefore, an object of the invention to provide a method of dyeing polypropylene with a new class of azo dyes to produce on the dyed polymer intense colors of excellent wash, dry cleaning and lightfastness.

In accordance with the invention, polyvalent metal-containing polypropylene is dyed with a 1-(2-pyridylazo)-2-hydroxyaryl compound of the formula:

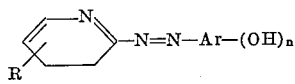

wherein R is hydrogen or a lower alkyl radical, such as methyl, ethyl, propyl or butyl; Ar is phenyl, tolyl, or naphthyl; $n$ has a value of 1–3; and at least one hydroxyl group on the Ar nucleus is in a position ortho- to the azo group.

The dyestuffs are conveniently applied to polypropylene from an aqueous bath using a dispersing agent. The polyvalent metal-containing polypropylene is commercially available. Ordinarily it contains from 0.05 to 2 percent, preferably from 0.05 to 0.2 percent, by weight of nickel, aluminum, cobalt, or chromium, although it can suitably contain any polyvalent metal, as described in the Caldwell et al. patent, U.S. 2,984,634.

The colorants used in the invention can be purchased commercially or they may be synthesized by known techniques from 2-aminopyridine or 2-aminopyridine containing a lower alkyl substituent.

Useful starting materials for the synthesis of the 2-aminopyridine intermediates used in the invention include 2-amino-5-methylpyridine, 2-amino-6-methylpyridine, 2-amino-4,6-dimethylpyridine, 2-amino-3-methylpyridine, and the like. To make the azo compounds used in the invention, the 2-aminopyridine can be first converted to its N-oxide by the method described by Adams et al., J. Am. Chem. Soc. 76, 2785–6 (1954). The amino group in the 2-position is converted to an acetoamido group and the corresponding 1-oxide is formed by oxidation with peracetic acid. Upon hydrolysis, 2-aminopyridine-1-oxides are formed. The 2-aminopyridine-1-oxide can be diazotized in the conventional manner and coupled into a suitable hydroxyaryl compound, such as phenol, beta-naphthol, resorcinol, m-cresol, p-cresol, pyrogallol, phluoroglucinol, and the like. The resulting azo compound is reduced with a suitable reducing agent, such as trialkylphosphite, to provide the dye useful in the invention.

An alternate method for making the dyestuffs for use in the invention is as follows:

A 2-aminopyridine is converted to the corresponding 2-pyridyl diazotate by mixing with butylnitrite and treatment with sodium ethylate at reflux, followed by condensation with the desired hydroxy aromatic compound, such as beta-naphthol.

Dyeing is best accomplished by providing a bath comprising an aqueous dispersion containing the desired dye in a concentration of 0.05 to 2 percent by weight. The dispersion is formed by using from 0.01 to 2 percent by weight of a conventional dispersant or emulsifying agent. Useful emulsifying agents include the alkali metal salts of alkylaryl sulfonates, the salts of sulfate esters of alkylphenoxypolyoxyethylene alkanols, long chain hydrocarbon alkali metal sulfonates, the alkali metal acylalkyl taurates, mono-alkyl biphenyl mono-sulfonate salts, dialkylphenyl phenyl disulfonate salts, polymerized salts of alkylnaphthalenesulfonic acids, alkylsulfate salts, alkylaminealkane sulfonates, polyoxyethylene alkyl ethers and thioethers, fatty alcohol ethylene oxides, polyoxyethylene alkylphenols, alkylphenoxypolyoxyethylene alcohols, polyoxyethylene esters of mixed fatty and rosin acids, and the like. Because of their commercial availability, the alkali metal alkylaryl sulfonates and alkylaminealkane sulfonates are preferred.

If desired, the dye bath can be adjusted to a slightly acid pH (ca. 4.5–6) by the addition of a dilute aqueous solution of an organic acid, such as acetic acid or an inorganic acid, such as phosphoric acid. The slightly acid pH assists in the formation of the metal complex on the fiber and in the rapid development of tinctorial strength.

Our invention is further illustrated by the following examples:

Example I

Commercial nickel-containing polypropylene was placed in 100 cc. of an aqueous dispersion containing one percent by weight of 1-(2-pyridylazo)-2-naphthol. The pH was adjusted to pH 5 by the addition of a one percent solution of acetic acid. The dispersion was maintained using one percent by weight of a commercially available dispersing agent, Nacconol NR, an alkylaryl sulfonate. The resulting violet dyeing exhibited excellent wash and dry cleaning fastness and 60 hours lightfastness as measured by a carbon-arc Fade-O-Meter.

Example II

The procedure of Example I was substantially repeated using 1-(2-pyridylazo)resorcinol. A red-brown dyeing of excellent wash and dry cleaning fastness at 60 hours lightfastness was obtained on nickel-containing polypropylene. Substantially identical results are obtained using aluminum-containing polypropylene, chromium-containing polypropylene, cobalt-containing polypropylene and zinc-containing polypropylene.

Example III

The procedure of Example I was substantially repeated using 4-methyl-2-(2-pyridylazo)-phenol. A reddish dying of good fastness properties was obtained.

Example IV

The procedure of Example II was substantially repeated using 2-(4-methylpyridyl-2-azo)-phenol. A reddish dying of good fastness properties was obtained.

We claim:

1. A method of dyeing polyvalent metal-containing polypropylene comprising applying thereto in an amount sufficient to impart color, an azo dye of the formula:

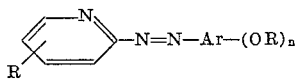

wherein R is a member selected from the group consisting of lower alkyl and hydrogen; Ar is a member selected from the group consisting of phenyl, tolyl and naphthyl; $n$ has a value of 1–3 and at least one hydroxyl group on the Ar nucleus is in a position ortho- to the azo group.

2. A method of dyeing polyvalent metal-containing polypropylene comprising contacting said polypropylene with an aqueous dispersion containing 0.05 to 2 percent by weight of an azo dye of the formula:

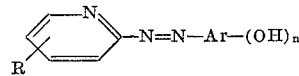

wherein R is a member selected from the group consisting of lower alkyl and hydrogen; Ar is a member selected from the group consisting of phenyl, tolyl, and naphthyl; $n$ has a value of 1–3 and at least one hydroxyl group on the Ar nucleus is in a position ortho- to the azo group, at an elevated temperature up to the reflux temperature of said dispersion.

3. Method according to claim 2 wherein the pH of the dispersion is adjusted to pH 4.5–6.

4. Polyvalent metal-containing polypropylene dyed in an amount sufficient to impart color with an azo dye of the formula:

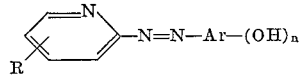

wherein R is a member selected from the group consisting of lower alkyl and hydrogen; Ar is a member selected from the group consisting of phenyl, tolyl and naphthyl; $n$ has a value of 1–3 and at least one hydroxyl group on the Ar nucleus is in a position ortho- to the azo group.

5. Nickel containing-polypropylene dyed with an azo compound of the formula:

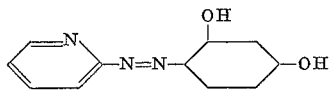

6. Nickel containing-polypropylene dyed with an azo compound of the formula:

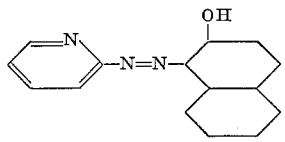

7. Nickel containing-polypropylene dyed with an azo compound of the formula:

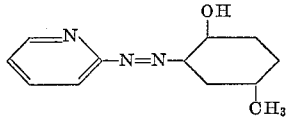

References Cited

UNITED STATES PATENTS

| | | | |
|---|---|---|---|
| 3,249,597 | 5/1966 | Dehn et al. | 260—156 |
| 3,254,072 | 5/1966 | Stright | 8—41 X |
| 3,312,681 | 4/1967 | Lewis | 260—156 |

NORMAN G. TORCHIN, *Primary Examiner.*

J. HERBERT, *Assistant Examiner.*